US007860806B2

(12) United States Patent
Grundstrom et al.

(10) Patent No.: US 7,860,806 B2
(45) Date of Patent: Dec. 28, 2010

(54) SYSTEM AND METHOD FOR CHARGING FOR DATA RECEPTION

(75) Inventors: Mika Grundstrom, Tampere (FI); Juha Salo, Littoinen (FI)

(73) Assignee: Nokia Corporation, Espoo (FI)

( * ) Notice: Subject to any disclaimer, the term of this patent is extended or adjusted under 35 U.S.C. 154(b) by 1090 days.

(21) Appl. No.: 10/096,712

(22) Filed: Mar. 12, 2002

(65) Prior Publication Data

US 2005/0015262 A1 Jan. 20, 2005

(51) Int. Cl.
*G06Q 99/00* (2006.01)
(52) U.S. Cl. .................... 705/400; 705/1.1; 705/40; 705/59; 705/80; 455/406; 379/196; 709/223
(58) Field of Classification Search .............. 705/1, 705/32, 52–54, 400, 7, 26, 1.1, 59, 80; 709/223, 709/224; 714/174; 379/196
See application file for complete search history.

(56) References Cited

U.S. PATENT DOCUMENTS

| 5,729,740 | A |   | 3/1998  | Tsumura ................ 707/104.1 |
|-----------|---|---|---------|-----------------------------------|
| 5,940,504 | A | * | 8/1999  | Griswold .................... 705/59 |
| 5,958,016 | A |   | 9/1999  | Chang et al. ............... 709/229 |
| 6,018,726 | A |   | 1/2000  | Tsumura .................... 705/412 |
| 6,035,281 | A |   | 3/2000  | Crosskey et al. ......... 424/145.1 |
| 6,069,957 | A | * | 5/2000  | Richards ................... 380/281 |
| 6,104,712 | A |   | 8/2000  | Robert et al. |
| 6,236,971 | B1| * | 5/2001  | Stefik et al. .................... 705/1 |
| 6,330,316 | B1| * | 12/2001 | Donak et al. ................ 379/196 |
| 6,389,541 | B1| * | 5/2002  | Patterson ....................... 726/9 |
| 6,427,140 | B1| * | 7/2002  | Ginter et al. .................. 705/80 |
| 2001/0025310 | A1 | * | 9/2001 | Krishnamurthy et al. .... 709/223 |
| 2002/0091544 | A1 | * | 7/2002 | Middeljans et al. ............ 705/1 |
| 2002/0118699 | A1 | * | 8/2002 | McKinnon et al. .......... 370/447 |
| 2003/0137685 | A1 | * | 7/2003 | Meade et al. .............. 358/1.14 |
| 2006/0019631 | A1 | * | 1/2006 | Hutcheson et al. .......... 455/406 |
| 2007/0130067 | A1 | * | 6/2007 | Keller ......................... 705/40 |

FOREIGN PATENT DOCUMENTS

| EP | 0 632 397 A | 1/1995 |
| EP | 0715243 A1 * | 6/1996 |
| JP | 2001160960 | 6/2001 |

OTHER PUBLICATIONS

Walker et al., "Protocol ensures safer multimedia delivery", Nov. 1, 1999, Network World, vol. 16, Iss. 44; p. 53, 1 pgs.*
Sarakaya et al., "An evaluation of quality of service characteristics of PACS packet channel", 1999, Mobile Networks and Applications. Amsterdam: vol. 4, Iss. 4; p. 289.*

(Continued)

*Primary Examiner*—Igor Borissov
*Assistant Examiner*—Freda A Nelson
(74) *Attorney, Agent, or Firm*—Ditthavong Mori & Steiner, P.C.

(57) ABSTRACT

Systems and methods that make use of acknowledgments in the charging of users for data reception. Certain of these systems and methods additionally consider quality of service.

60 Claims, 6 Drawing Sheets

OTHER PUBLICATIONS

Peers, Martin; "Sony, BMG Entertainment To Start Selling Music on Web—Some Digital Downloads Will Priced Like CDs—Neither Company Intends to Employ the MP3 Format", Apr 10, 2000, Asian Wall Street Journal, p. 10.*

Walker et al, "Protocol ensures safer multimedia delivery", Nov. 1, 1999, Network World, vol. 16, Iss. 44; p. 53, 1 pgs.*

International Search Report from Application No. PCT/IB03/00866.

Network Data Mamageent—Usage (NDM-U) For IP Based Services IPDR. ORG, Oct. 23, 2000.

Wireless Application Access White Paper, Citrix Systems, Inc., Copyright 2001.

Chinese Office action for corresponding CN App. No. 03806589.4 dated Apr. 1, 2010, pp. 1-6.

* cited by examiner

SYSTEM AND METHOD FOR CHARGING FOR DATA RECEPTION

FIELD OF INVENTION

This invention relates to systems and methods for charging for data reception.

BACKGROUND INFORMATION

In recent years, there has been an increase in the distribution of content items such as movies, music, and software using network access points, particularly wireless network access points. It is arguable that, if growth in this sector is to continue, the entities involved must be insured of the profitability of the endeavor. One way to help insure profitability may be to introduce improved billing methods.

SUMMARY OF THE INVENTION

Embodiments of the present invention provide systems and methods that make use of acknowledgments in the charging of users for data reception. Certain embodiments further consider quality of service.

DETAILED DESCRIPTION OF THE INVENTION

Core Implementation

There exist in the art a number of acknowledgement-dependent transmission protocols. One well-known protocol of this type is Transmission Control Protocol (TCP). Other such protocols include dependable multicast protocols such as Reliable Multicast Transport Protocol (RMT). A common property of protocols of this sort is that sustained transmission requires that the recipient acknowledge data reception.

For example, in TCP a recipient acknowledges each received TCP packet by dispatching to the sender a TCP packet including an acknowledgment number. If a particular packet is not acknowledged within a certain period of time, the sender resends the packet. A sender will make repeated attempts to transmit an unacknowledged packet, but will eventually abandon the endeavor if no acknowledgment is received. Embodiments of the present invention make use of acknowledgment-dependent protocols in the charging of users for data reception.

Figure 1:
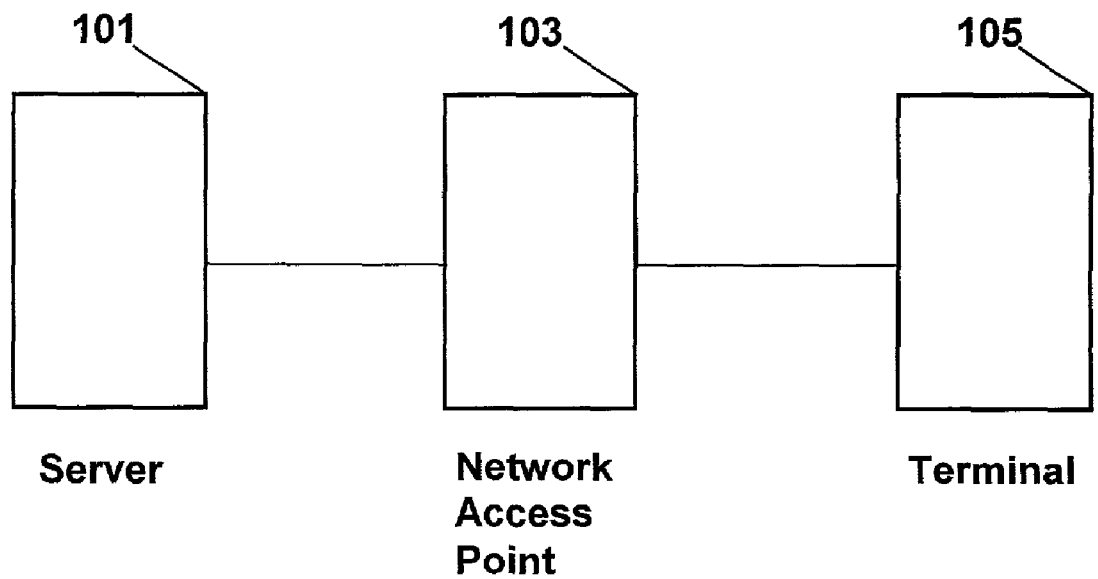
FIG. 1 shows an exemplary network arrangement.

FIG. 1 shows an exemplary network arrangement. Server 101 has a network connection to network access point 103 which, in turn, has a network connection to terminal 105. The connection between the server and the access point in this example is bidirectional, and can be wired or wireless. Similarly, the connection between the network access point and the terminal is bidirectional and can be wired or wireless. In the case where this connection is wireless, access point 103 might be an IEEE 802.11b or UMTS (Universal Mobile Telecommunications Service) base station. In the case where this connection is wired, the access point might be an ISP (internet service provider), cable headend, or the like with the wired connection being a telephone or cable connection. Terminal 105 should be thought as of having the proper network interface to connect with access point 103. For example, in the case where the access point is an 802.11b base station, the terminal should be thought of as having an 802.11b network interface. Although only one server, access point, and terminal are shown in this example, in practice there could be several of each of these.

Imagine that server 101 is sending packetizied data to terminal 105 using an acknowledgment-dependent protocol such as TCP or RMT. The packets are sent from the server to the network access point, which in turn passes them to the terminal 105. Running on the terminal could be a networking stack implementing the appropriate acknowledgment-dependent protocol. In accordance with the protocol, the terminal acknowledges each received packet. The terminal may do this by dispatching a packet containing an appropriate acknowledgment number. This packet would be received by the access point and passed on to the server. The server would recognize the acknowledgment and knows that the packet it sent was properly received. As alluded to above, if the packet had not been properly received at the terminal, no acknowledgment would have been dispatched. Accordingly, the server would have noted the lack of acknowledgment and would have retransmitted the packet. The server would have retransmitted the packet until it was properly acknowledged, or until it hit a threshold essentially limiting the allowed number of retransmission tries.

Figure 2:
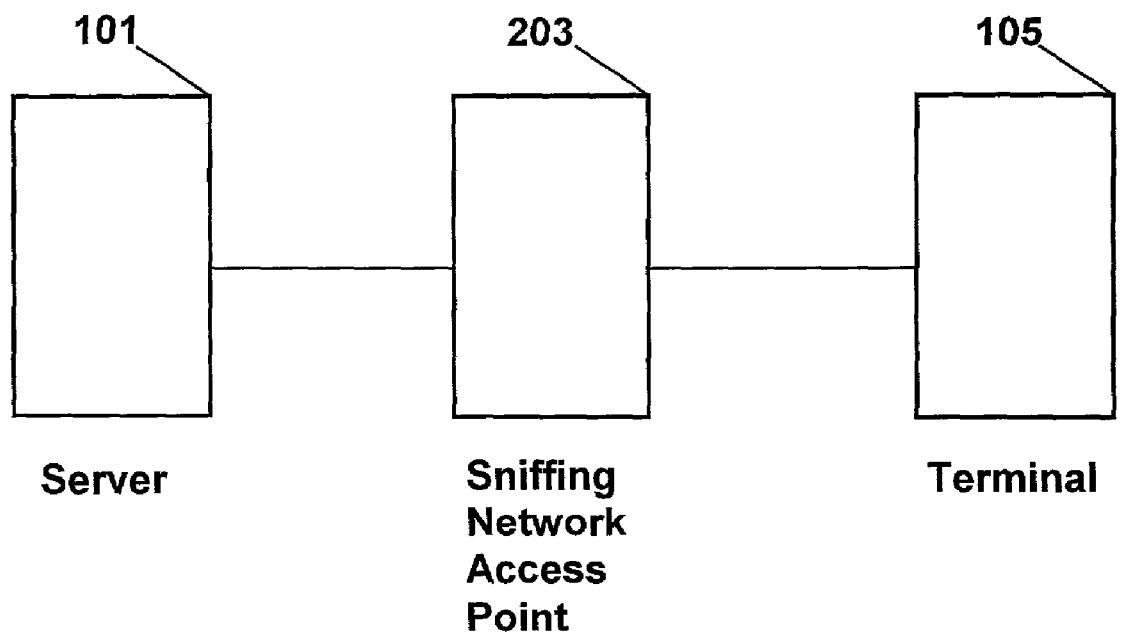
FIG. 2 shows an exemplary network arrangement according to embodiments of the present invention.

The network arrangement of FIG. 2 is similar to that of FIG. 1, but is modified in accordance with embodiments of the present invention to replace access point 103 with sniffing network access point 203. The functionality of the sniffing access point is similar to that of access point 103, but adds additional capability that allows for the charging of users for the receipt of data.

For example, running on the sniffing access point, or a computer associated therewith, may be a recognition module that sniffs the packets that pass through the access point, and watches for packets that contain reception acknowledgments. Sniffing could be performed in a number of ways well-known in the art, including monitoring the flow of data through the appropriate network interface (e.g., /en0) in light of packet structures of the transmission protocols being employed (e.g., IP and TCP).

Upon the recognition module's detection of such a packet, an identification module, that could determine the identity of the terminal that sent the acknowledgment, might be consulted. Determination of terminal identity may be accomplished, for example, by consulting a MAC (media access control) header associated with the packet and extracting the unique MAC terminal identifier. In other embodiments, terminal identity could be learned by examining the IP header associated with the packet and extracting the source IP address. The identification module could then consult an association module in order to determine a unique terminal identifier associated with the extracted IP address. The association module could maintain in a related store a database that associated IP addresses with unique terminal identifiers. Such a database could be compiled, for example, during the assignment of IP addresses to terminals. In certain embodiments, the identification module could also act to determine the identity of the server to which the acknowledgment was addressed. This could be performed, for example, by examining the IP header associated with the packet, extracting the destination IP address, and then consulting the association module. The association module could maintain a database associating IP addresses with unique server identifiers. Such a database could be compiled using data submitted by entities responsible for maintaining servers and providing content.

Once the identification module has recognized the acknowledging terminal, and in some embodiments the sending server, a billing module could be called upon. The billing module could perform actions to charge the user or entity associated with the identified terminal for the received packet. The billing module could maintain in a related store a database associating terminal identities with billing information. Billing information could include, for example, name and credit card number. The billing module could consult its store to learn the appropriate billing information related to the reception by a particular terminal of a particular packet. The billing module could next take steps in order to determine the price that should be charged for the packet. Depending on the embodiment, this could be performed in a number of ways.

For example, in certain embodiments a predetermined price could be charged for each packet, regardless of the amount of data it delivered, and further regardless of the server that transmitted it. The price could be set, for example, by a network administrator. In other embodiments, a predetermined price could be charged for a packet, regardless of its size, but depending on the sending server and/or entity. For example an entity responsible for a server could set a predetermined price for all packets set by that server. Prices could be, for example, received periodically by the access point via one of the networks to which it enjoys connectivity.

In other embodiments, the price charged for a packet could take into account its size. This could be implemented in a number of ways. For example, the billing module could submit a query to a size logger module running the sending server, the query including the acknowledgment number extracted from a packet and asking the packet's size. In such embodiments, the size logger module could be programmed to log the size of transmitted packets with respect to the acknowledgment numbers expected to be received for those packets. Upon receipt of such a request, the sending server could consult the log and report back to the billing module how the packet's size. Communication between the billing module of the access point and the size logger module running on the server could be implemented in a number of ways, including the use of SOAP (simple object access protocol) or RMI (remote method invocation). In certain embodiments of this sort, the price charged for a packet could depend only on its size. In other embodiments of this sort, the price could also take into account the sending server and/or entity. Such prices could be set and/or received in a manner similar to that described above with reference to size-regardless pricing.

It is further noted that in certain embodiments, the billing module could determine the price that should be charged for a packet by querying a pricing module running on the server that sent the packet. The functionality would be similar to that of the size logger module described above, but the size logger module running on the server would respond with price not size. The module might, instead of or in addition to logging the size of sent packets, log some indication of the data contained therein. Thus the module might log that a particular packet was a portion of a QuickTime, high-resolution presentation of "Star Trek: Fist Contact". The module could, for example, determine the price that should be charged for a packet by consulting a table or applying an equation. Equations and tables could be supplied by an employee of the entity that operates the server. The table might indicate, the prices that should be charged for packets relating various content items. Thus a price could be listed for a packet corresponding to a QuickTime, high-resolution presentation of "Star Trek: Fist Contact".

Once the price had been determined, the billing module could take further steps to bill the appropriate customer or entity. For example, the module could log the price and the billing information into a store. Also placed in the store could be data relating to the sender of the packet. Such functionality could allow the entity operating the network access point to perform billing on behalf of the entity operating the server. In certain embodiments, all of the money charged could be earmarked for the sending entity. In other embodiments, a portion could be earmarked for the sending entity and a portion earmarked for the entity operating the access point.

Once a certain price threshold had been reached, appropriate information could be sent to a module running on a credit card company computer, billing computer associated with the entity operating the network access point, billing computer associated with the entity operating the sever, or other billing computer. In other embodiments, no threshold would be implemented and each packet would be handed one-by-one.

Figure 3:
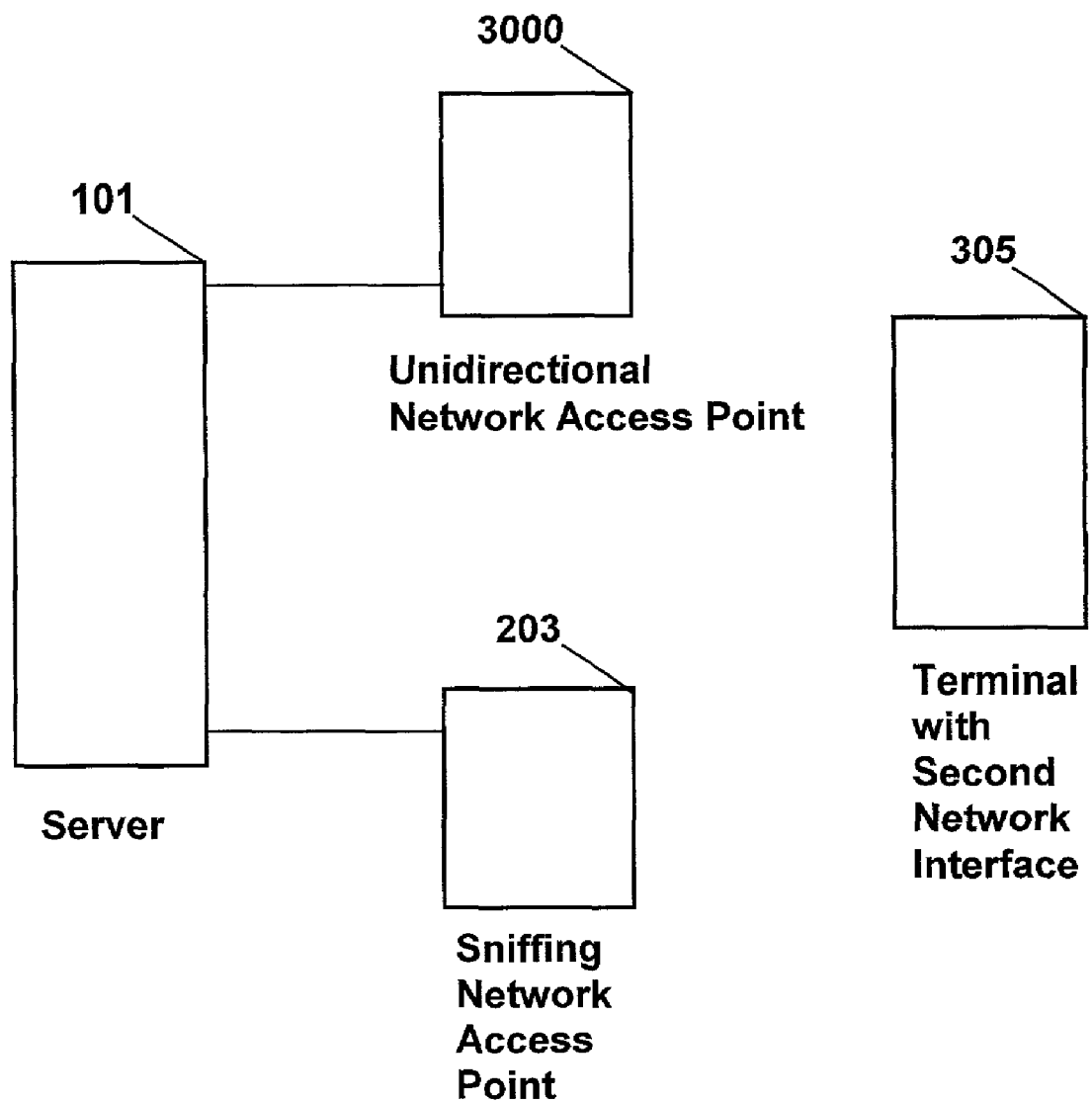
FIG. 3 shows an additional exemplary network arrangement according to embodiments of the present invention.

Shown in FIG. 3 is a network arrangement similar to that of FIG. 2, but including unidirectional network access point 3000, and substituting terminal 305 for terminal 105. Access point 3000 has provides a unidirectional link from itself to the terminal. The link from the server to access point 3000 may be unidirectional as well. Access point 3000 may be, for example, a DVB-T (Terrestrial Digital Video Broadcast) base station. Terminal 305 differs from terminal 105 in that includes a second network interface that allows it to receive communications from the unidirectional network access point.

The functionality of this network arrangement is similar to that described above with reference to FIG. 2, the difference of significance being that packets dispatched by server 101 to device 105 pass through unidirectional network access point 3000 rather than through access point 203. Acknowledgments sent by the terminal to the server continue to pass through access point 203 as described with reference to FIG. 2.

Figure 4:
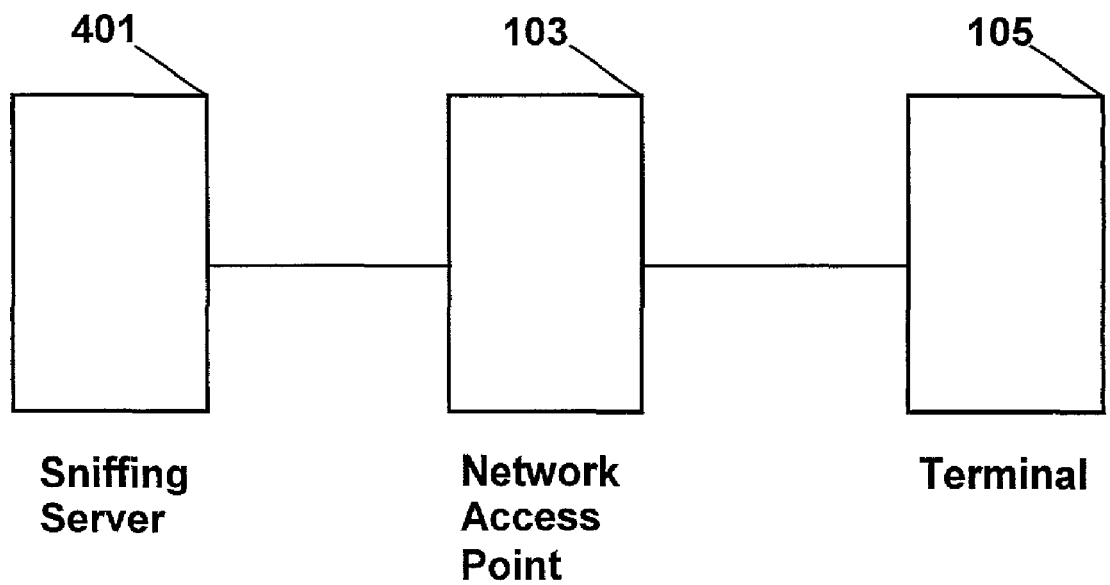
FIG. 4 shows a further exemplary network arrangement according to embodiments of the present invention.

Shown in FIG. 4 is a network arrangement similar to that of FIG. 1, but modified in accordance with embodiments of the present invention to include sniffing server 401. The functionality of the sniffing server is similar to that of server 101, but adds additional functionality, similar to that described above with reference to sniffing network access point 203, that allows for the charging of users for the receipt of data.

More specifically, running the sniffing server, or a computer associated therewith, may be recognition module that operates in a manner analogous to that of the recognition module described above with reference to FIG. 2 to watch for packets that contain acknowledgments. Also running may be identification module that operates in a manner analogous to that of the identification module described above with reference to FIG. 2 to determine the identity of a terminal that sent a recognized acknowledgment.

In certain embodiments, also operating on the sniffing server could be a billing module that acts in a manner substantially analogous to that of billing module described above with reference to FIG. 2, the main difference being that it might not handle billing for other entities and/or servers. Also running could be a size logger module and/or pricing module that acts analogously to those described above with reference to FIG. 2. It is mentioned that the billing module associated with FIG. 4 would not need to employ a protocol such as SOAP in order to communicate with the size logger or the pricing module, as these modules would likely be operating on the same device as the billing module. It will be obvious to those of skill in the art that the arrangement shown in FIG. 4 may, in a manner analogous to the way in which the arrangement of FIG. 2 was adapted to yield the arrangement of FIG. 3, be adapted to further incorporate a unidirectional network access point.

Quality of Service Extensions

Figure 5:
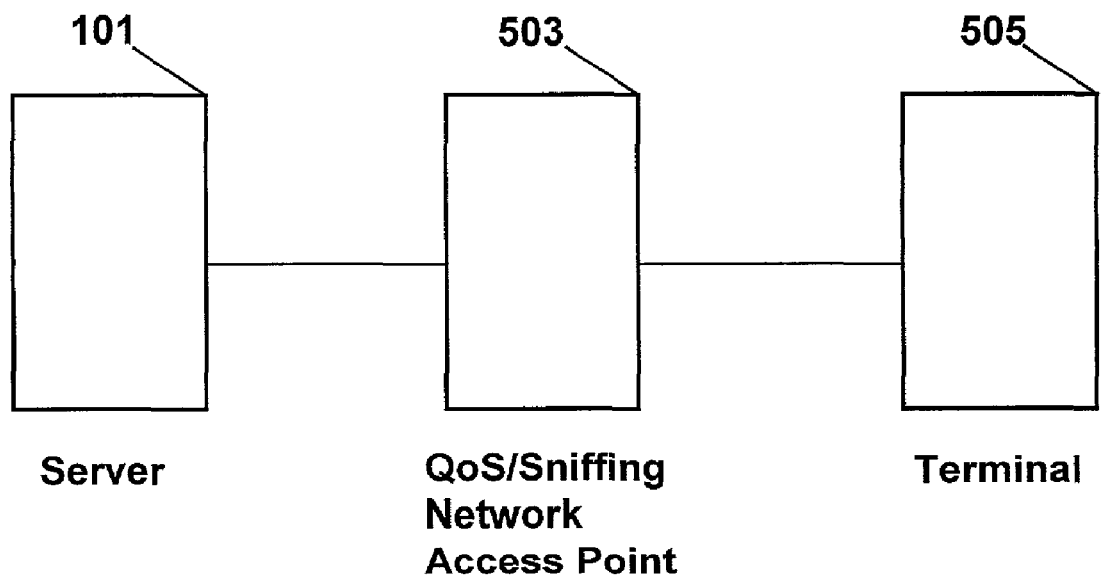
FIG. 5 shows a further exemplary network arrangement according to embodiments of the present invention.

The network arrangement of FIG. 5 is similar to that of FIG. 2, but is modified in accordance with embodiments of the present invention to include QoS/sniffing network access point 503 and quality monitoring terminal 505. The functionalities of the QoS/sniffing network access point and the quality monitoring terminal are similar, respectively, to the sniffing network access point 203 and the terminal 105, but include additional capabilities that allow for the charging of users for the receipt of data in ways that take into account quality of service enjoyed.

In one aspect, additional capabilities are provided by a number of software modules running on the quality monitoring terminal. These software modules include a plurality of quality monitoring modules, and a reporting module.

Each of the quality monitoring modules may function to monitor one or more quality of service aspects. For example, one quality monitor module might measure the BER (bit error rate) experienced, while another might count lost frames or lost frames per unit time. Additional quality of service measurements that could be performed by such modules will be obvious to those of skill in the art.

The quality monitoring modules could be dynamically loaded upon the quality monitoring terminal's startup. New monitoring modules could be transmitted by a network administrator or the like to the terminal, and modules could be removed by having a network administrator or the like transmit a module deletion command to the terminal. The reporting module could periodically receive from each monitoring module a report of quality of service measurements. The reporting module could maintain an array with an element corresponding to each reporting module and, upon receipt of a report from a particular reporting module, populate the corresponding element of the array.

Running on the quality monitoring terminal could be a networking stack implementing an acknowledgment-dependent protocol such as TCP or RMT. As is known in the art, many acknowledgment-dependent protocols allow an acknowledgment to be dispatched in a piggybacked manner; in other words to be carried along with a normal data bearing packet. Thus if the acknowledgment-dependent protocol was, for example, TCP, an acknowledgment from recipient to sender could be included in a TCP packet carrying non-acknowledgment data directed to the sender.

According to embodiments of the invention, the reporting module could be configured to instruct the networking stack to dispatch each acknowledgment piggybacked onto a packet containing a representation of the contents of the reporting module's array. Thus a particular acknowledgment could be piggybacked onto a packet, directed to the server, representing the reporting module's array at the time the packet was constructed. It is noted that, in certain embodiments, the reporting module might be configured to only periodically instruct the networking stack to dispatch such an acknowledgement. Consequently, in such an embodiment, only certain acknowledgments received by the server would be piggybacked onto quality of service report data.

As alluded to above, the QoS/sniffing network access point provides additional functionality over its sniffing network access point 203 counterpart. In one aspect, additional capabilities are provided by a number of software modules running on the QoS/sniffing network access point or computer associated therewith. These software modules, in relation to those of sniffing network access point 203, include both entirely new modules and enhanced versions of existing modules. One new module could be a QoS extraction module. This module could operate, upon the recognition module's detection of a packet bearing an acknowledgment, to extract any reporting module array representation to which the acknowledgment was piggybacked. This could be achieved, for example, by accessing the appropriate data-bearing portion of the sniffed packet.

In the case where an acknowledgment is associated with no reporting module array representation, the QoS extraction module might note that no quality of service information is associated with the particular acknowledgement. In the case where a reporting module array representation is found, the module could note the included quality of service report. In certain cases, the QoS extraction module could consult a QoS verifier module to get an opinion on the validity of the quality of service report. The QoS extraction module could note the opinion received.

In a system where reported quality of service has a bearing upon price charged, it is envisioned that some dishonest users would attempt to modify their terminals to report lower qualities of service than what is actually enjoyed. Thus, for example, a user might receive a film such that he experiences a high quality of service, but modify his terminal to dishonestly report that a low quality of service was experienced, with the goal of being charged less for the film. The QoS verifier module could act to compare a reported quality of service against its perception of what the reported quality of service should be. In the case where the module's perceived quality of service differs by more than a predetermined amount from the reported quality of service, the module could determine that the reported quality of service is of questionable accuracy.

There are a number of ways the QoS verifier module could formulate a perception of what a reported quality of service should be. For example, the QoS verifier module could compare a reported quality of service to the quality of services reported by other terminals receiving similar content and/or located in approximately the same geographical area. As another example, the QoS verifier module could view the reported quality of service in light of the number of retransmissions made to the corresponding terminal; the QoS verifier module might expect that a low quality of service not be reported when few retransmissions were necessary.

In the case where the QoS extraction module notes no quality of service report, this determination could be passed to the billing module. In the case where the QoS extraction module notes a reported quality of service, the report could be forwarded to the billing module. In the appropriate embodiments, the forwarded report could further include the QoS extraction module's notation of whether or not the report was of questionable accuracy.

The billing module could act in a manner similar to that described above, but its determination of price could also take into account a quality of service report. Thus, for example, the price specifications supplied to the billing module by a terminal-operating entity additionally impart how reported quality of service should alter price charged.

In a case where a reported quality of service was determined to be of questionable accuracy, the billing module might record that fact and/or report it to the entity responsible for the server that transmitted the corresponding content.

Furthermore, price specifications supplied to the billing module might additionally include indications of how to handle reports of questionable accuracy. For example it might be specified that, in the case where a quality of service report is of questionable accuracy, the user should be charged the price associated with a report specifying that the highest possible quality had been enjoyed. Alternately, it might be specified that a fine be levied. In certain cases, it might be specified that the fine only be levied if more than a predetermined number of questionable reports had been received.

In the case where no quality of service had been reported, functionality could be identical to that described above with reference to a quality of service report of questionable accuracy. Alternately price specifications supplied to the billing module might indicate that, when no quality of service is reported, the price charged be that corresponding to the median price chargeable for the packet. In certain cases the billing module might consult an associated store to determine if the receiving terminal is equipped with quality of service reporting capability. In the case the terminal possesses the capability, a lack of a quality of service report could be interpreted as a fraudulent act, and the first course of action (i.e., charging a premium price or levying a fine) might be taken. In the case where the terminal lacked the capability, the second course of action might be taken.

The embodiment described with reference to FIG. 5 has been a modification of the embodiment described with reference to FIG. 2. However, it will be obvious to those of skill in the art that the embodiment relating to FIG. 5 could easily be implemented as a modification of the embodiment of FIG. 3, so as to yield an embodiment where a unidirectional access point is employed. It will be similarly obvious that that the embodiment relating to FIG. 5 could easily be implemented as a modification of the embodiment of FIG. 4, so as to yield as an embodiment where the sniffing and quality of service handling functionality is associated with the server rather than with the bidirectional access point. Similarly, the embodiment of FIG. 5 could easily be implemented to yield and embodiment where the sniffing and quality of service handling functionality is associated with the server rather than with the bidirectional access point, and where a unidirectional access point is employed.

Hardware and Software

Certain aspects of the present invention may be executed by or with the help of a general purpose computer. For example, the above-described device for selecting and receiving content items may be implemented as a general purpose computer equipped with network interfaces.

Figure 6:
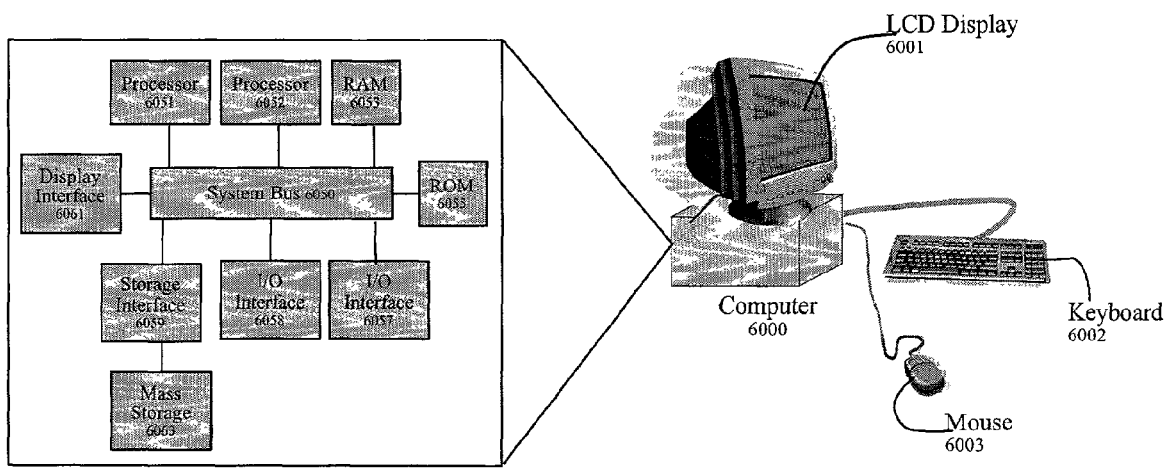
FIG. 6 shows an exemplary general purpose computer involved with certain embodiments of the present invention.

The phrases "general purpose computer," "computer," and the like, as used herein, refer but are not limited to an engineering workstation, PC, Macintosh, PDA, mobile terminal, server, network access point element and the like running an operating system such as OS X, Linux, Darwin, Windows CE, Windows XP, Symbian EPOC, or the like, perhaps with support for Java. The phrases "General purpose computer," "computer," and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 6000 as shown in FIG. 6 includes system bus 6050 which operatively connects two processors 6051 and 6052, random access memory (RAM) 6053, read-only memory (ROM) 6055, input output (I/O) interfaces 6057 and 6058, storage interface 6059, and display interface 6061. Storage interface 6059 in turn connects to mass storage 6063. Each of I/O interfaces 6057 and 6058 may be an Ethernet, IEEE 1394, IEEE 802.11, or other interface such as is known in the art. Mass storage 6063 may be a hard drive, optical disk, or the like. Processors 6057 and 6058 may each be a commonly known processor such as an IBM or Motorola PowerPC, an Intel StrongARM, or an Intel Pentium.

Computer 6000 as shown in this example also includes an LCD display unit 6001, a keyboard 6002 and a mouse 6003. In alternate embodiments, keyboard 6002 and/or mouse 6003 might be replaced with a pen interface. Computer 6000 may additionally include or be attached to card readers, DVD drives, or floppy disk drives whereby media containing program code may be inserted for the purpose of loading the code onto the computer. In accordance with the present invention, computer 6000 may run one or more of the software modules described above, with the modules being programmed using a language such as Java, Objective C, C, C#, or C++ according to methods known in the art.

It is specifically noted that the general purpose computer terminal described herein could be, for example, a portable device comprising an ARM or a StrongARM processor, an integrated touch-sensitive color screen with the ability to receive DVB-T transmissions and the ability to send and receive UMTS, GPRS, or other transmissions. The device could use an operating system such as Microsoft Windows CE or Symbian EPOC, perhaps with support for Java.

Ramifications and Scope

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

What is claimed is:

1. A method, comprising:
    transmitting data by a processor to a user using an acknowledgment-dependent protocol;
    determining by a processor a quality of service that was delivered and should have been reported by the user;
    comparing by a processor an inaccurate quality of service specification knowingly reported by the user against the quality of service that should have been reported;
    when determining the reported quality of service specification is lower than, by more than a predetermined amount, the quality of service that should have been reported, charging the user by a processor a fee,
    wherein a piggybacked acknowledgment sent according to said protocol is recognized.

2. The method of claim 1, wherein said acknowledgment-dependent protocol is a transmission control protocol.

3. The method of claim 1, wherein said acknowledgment-dependent protocol is a dependable multicast protocol.

4. The method of claim 1, wherein the recognition involves sniffing packets.

5. The method of claim 1, wherein the recognition is performed at a network access point.

6. The method of claim 1, wherein the recognition is performed by a provider of said data.

7. The method of claim 1, wherein charging takes into account an amount of data acknowledged by said acknowledgment.

8. The method of claim 1, wherein charging takes into account a type of data acknowledged by said acknowledgment.

9. The method of claim 1 wherein said acknowledgement and said data travel on one network.

10. The method of claim 1 wherein said acknowledgement and said data travel on different networks.

11. A method, comprising:
transmitting data by a processor to a user using an acknowledgment-dependent protocol;
determining a quality of service that was delivered and should have been reported by the user;
comparing by a processor an inaccurate quality of service specification knowingly reported by the user against the quality of service that should have been reported;
when determining the reported quality of service specification is lower than, by more than a predetermined amount, the quality of service that should have been reported, charging the user by a processor a fee,
wherein an acknowledgment sent according to said protocol is recognized, said acknowledgment being piggybacked onto the quality of service specification.

12. The method of claim 11, wherein said acknowledgment-dependent protocol is a transmission control protocol.

13. The method of claim 11, wherein said acknowledgment-dependent protocol is a dependable multicast protocol.

14. The method of claim 11, wherein the recognition involves sniffing packets.

15. The method of claim 11, wherein the recognition is performed at a network access point.

16. The method of claim 11, wherein the recognition is performed by a provider of said data.

17. The method of claim 11, wherein said charging takes into account an amount of data acknowledged by said acknowledgment.

18. The method of claim 11, wherein said charging takes into account a type of data acknowledged by said acknowledgment.

19. The method of claim 11 wherein said acknowledgement and said data travel on one network.

20. The method of claim 11 wherein said acknowledgement and said data travel on different networks.

21. A method, comprising:
transmitting data by a processor to a user using an acknowledgment-dependent protocol;
determining a quality of service that was delivered and should have been reported by the user;
comparing by a processor an inaccurate quality of service specification knowingly reported by the user against the quality of service that should have been reported;
when determining the reported quality of service specification is lower than, by more than a predetermined amount, the quality of service that should have been reported, charging the user by a processor a fee,
wherein an acknowledgment sent according to said protocol is recognized, said acknowledgment being piggybacked onto the quality of service specification.

22. The method of claim 21, wherein said acknowledgment-dependent protocol is a transmission control protocol.

23. The method of claim 21, wherein said acknowledgment-dependent protocol is a dependable multicast protocol.

24. The method of claim 21, wherein the recognition involves sniffing packets.

25. The method of claim 21, wherein the recognition is performed at a network access point.

26. The method of claim 21, wherein the recognition is performed by a provider of said data.

27. The method of claim 21, wherein said charging takes into account an amount of data acknowledged by said acknowledgment.

28. The method of claim 21, wherein said charging takes into account a type of data acknowledged by said acknowledgment.

29. The method of claim 21 wherein said acknowledgement and said data travel on one network.

30. The method of claim 21 wherein said acknowledgement and said data travel on different networks.

31. An apparatus, comprising:
a memory; and
a processor configured to:
transmit data to a user using an acknowledgment-dependent protocol;
determine a quality of service that was delivered and should have been reported by the user;
compare an inaccurate quality of service specification knowingly reported by the user against the quality of service that should have been reported;
when determine the reported quality of service specification is lower than, by more than a predetermined amount, the quality of service that should have been reported, charge the user a fee,
wherein a piggybacked acknowledgment sent according to said protocol is recognized.

32. The apparatus of claim 31, wherein said acknowledgment-dependent protocol is a transmission control protocol.

33. The apparatus of claim 31, wherein said acknowledgment-dependent protocol is a dependable multicast protocol.

34. The apparatus of claim 31, wherein the recognition involves sniffing packets.

35. The apparatus of claim 31, wherein the recognition is performed at a network access point.

36. The apparatus of claim 31, wherein the recognition is performed by a provider of said data.

37. The apparatus of claim 31, wherein charging takes into account an amount of data acknowledged by said acknowledgment.

38. The apparatus of claim 31, wherein charging takes into account a type of data acknowledged by said acknowledgment.

39. The apparatus of claim 31 wherein said acknowledgement and said data travel on one network.

40. An apparatus, comprising:
a memory; and
a processor configured to:
transmit data to a user using an acknowledgment-dependent protocol;
determine a quality of service that was delivered and should have been reported by the user;
compare an inaccurate quality of service specification knowingly reported by the user against the quality of service that should have been reported;
when determine the reported quality of service specification is lower than, by more than a predetermined amount, the quality of service that should have been reported, charge the user a fee,
wherein an acknowledgment sent according to said protocol is recognized, said acknowledgment being piggybacked onto the quality of service specification.

41. The apparatus of claim 40 wherein said acknowledgement and said data travel on different networks.

42. The apparatus of claim 41, wherein said acknowledgment-dependent protocol is a transmission control protocol.

43. The apparatus of claim 41, wherein said acknowledgment-dependent protocol is a dependable multicast protocol.

44. The apparatus of claim 41, wherein the recognition involves sniffing packets.

45. The apparatus of claim 41, wherein the recognition is performed at a network access point.

46. The apparatus of claim 41, wherein the recognition is performed by a provider of said data.

47. The apparatus of claim 41, wherein said charging takes into account an amount of data acknowledged by said acknowledgment.

48. The apparatus of claim 41, wherein said charging takes into account a type of data acknowledged by said acknowledgment.

49. The apparatus of claim 41 wherein said acknowledgement and said data travel on one network.

50. The apparatus of claim 41 wherein said acknowledgement and said data travel on different networks.

51. An apparatus, comprising:
a memory; and
a processor configured to:
transmit data to a user using an acknowledgment-dependent protocol;
determine a quality of service that was delivered and should have been reported by the user;
compare an inaccurate quality of service specification knowingly reported by the user against the quality of service that should have been reported;
when determine the reported quality of service specification is lower than, by more than a predetermined amount, the quality of service that should have been reported, charge the user a fee,
wherein an acknowledgment sent according to said protocol is recognized, said acknowledgment being piggy-backed onto the quality of service specification.

52. The apparatus of claim 51, wherein said acknowledgment-dependent protocol is a transmission control protocol.

53. The apparatus of claim 51, wherein said acknowledgment-dependent protocol is a dependable multicast protocol.

54. The apparatus of claim 51, wherein the recognition involves sniffing packets.

55. The apparatus of claim 51, wherein the recognition is performed at a network access point.

56. The apparatus of claim 51, wherein the recognition is performed by the provider of said data.

57. The apparatus of claim 51, wherein said charging takes into account the amount of data acknowledged by said acknowledgment.

58. The apparatus of claim 51, wherein said charging takes into account the type of data acknowledged by said acknowledgment.

59. The apparatus of claim 51 wherein said acknowledgement and said data travel on the same network.

60. The apparatus of claim 51 wherein said acknowledgement and said data travel on different networks.

* * * * *